US010928675B2

(12) United States Patent
Kim et al.

(10) Patent No.: US 10,928,675 B2
(45) Date of Patent: Feb. 23, 2021

(54) DISPLAY APPARATUS

(71) Applicant: SAMSUNG ELECTRONICS CO., LTD., Suwon-si (KR)

(72) Inventors: Jong Bin Kim, Suwon-si (KR); Byoung Jin Cho, Suwon-si (KR); Young Chol Lee, Suwon-si (KR); Ho Seok Lee, Suwon-si (KR); Nae Won Jang, Suwon-si (KR); Suk Ju Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/577,600

(22) Filed: Sep. 20, 2019

(65) Prior Publication Data

US 2020/0096823 A1 Mar. 26, 2020

(30) Foreign Application Priority Data

Sep. 21, 2018 (KR) .................... 10-2018-0113777

(51) Int. Cl.
*G02F 1/13357* (2006.01)
*G02F 1/1333* (2006.01)
*F21V 8/00* (2006.01)

(52) U.S. Cl.
CPC ..... *G02F 1/133608* (2013.01); *G02B 6/0055* (2013.01); *G02B 6/0068* (2013.01); *G02B 6/0075* (2013.01); *G02F 1/133308* (2013.01); *G02F 1/133605* (2013.01); *G02F 2001/13332* (2013.01); *G02F 2001/133314* (2013.01); *G02F 2001/133317* (2013.01)

(58) Field of Classification Search
None
See application file for complete search history.

(56) References Cited

U.S. PATENT DOCUMENTS

2008/0157009 A1* 7/2008 Wittenberg ....... G02F 1/133602
250/494.1
2012/0257406 A1* 10/2012 Minami ............... H04N 13/312
362/602
2018/0267225 A1 9/2018 Wong

FOREIGN PATENT DOCUMENTS

| JP | 2012-68588 A | 4/2012 |
| KR | 10-2009-0093046 A | 9/2009 |
| KR | 10-2015-0062381 A | 6/2015 |
| KR | 10-2016-0067447 A | 6/2016 |

OTHER PUBLICATIONS

International Search Report dated Jan. 16, 2020 issued by the International Searching Authority in counterpart International Application No. PCT/KR2019/012289 (PCT/ISA/210).

* cited by examiner

*Primary Examiner* — Britt D Hanley
(74) *Attorney, Agent, or Firm* — Sughrue Mion, PLLC

(57) ABSTRACT

Disclosed is a display apparatus including a display panel; and a light source assembly including: a plurality of first light sources disposed in a first region to supply first light toward the display panel; a light guide plate including: incident surface configured to receive second light; and an exit surface facing the display panel and configured to transmit the second light received from the incident surface of the light guide plate to the display panel; and a plurality of second light sources disposed on a periphery of the first region to supply the second light to the incident surface of the light guide plate.

18 Claims, 10 Drawing Sheets

DISPLAY APPARATUS

CROSS-REFERENCE TO RELATED APPLICATION

This application is based on and claims priority under 35 U.S.C. § 119 to Korean Patent Application No. 10-2018-0113777, filed on Sep. 21, 2018, in the Korean Intellectual Property Office, the disclosure of which is incorporated by reference herein in its entirety.

BACKGROUND

1. Technical Field

The disclosure relates to a display apparatus, and more particularly, to a display apparatus having a local dimming structure.

2. Description of the Related Art

A display apparatus is an output apparatus which converts acquired or stored electrical information into visual information and displays the visual information to a user. The display apparatus is widely used in both in homes and in businesses.

The display apparatus displays an image on a screen such as a monitor or a television. For example, a self-luminescence display panel such as an organic light-emitting diode (OLED) or a non-self-luminescence display panel such as a liquid crystal display (LCD) panel may be used as the display apparatus to display an image.

In a display apparatus of the related art, in order to output a dark portion of an image on the screen, the amount of light of a backlight for the dark portion of the image is reduced (for a non-self-luminescence display panel) or light generation in the corresponding portion of the display apparatus for the dark portion of the image is turned off (for a self-luminescence display panel).

SUMMARY

It is an aspect of the disclosure to provide a display apparatus with improved light efficiency.

It is another aspect of the disclosure to provide a display apparatus having an improved local dimming structure.

It is another aspect of the disclosure to provide a display apparatus having a simplified structure.

It is another aspect of the disclosure to provide a display apparatus capable of reducing the thickness in the front-rear direction.

Additional aspects of the disclosure will be set forth in part in the description which follows and, in part, will be obvious from the description, or may be learned by practice of the disclosure.

In accordance with an aspect of the disclosure, a display apparatus includes a display panel; and a light source assembly including: a plurality of first light sources disposed in a first region to supply first light toward the display panel; a light guide plate including: incident surface configured to receive second light; and an exit surface facing the display panel and configured to transmit the second light received from the incident surface of the light guide plate to the display panel; and a plurality of second light sources disposed on a periphery of the first region to supply the second light to the incident surface of the light guide plate.

The plurality of first light sources and the exit surface of the light guide plate may be configured to face different portions of the display panel.

The display apparatus may further include: a bottom chassis disposed in the rear of the display panel and configured to support the light source assembly, the bottom chassis including: a first chassis in which the plurality of first light sources are disposed; and a second chassis disposed on a periphery of the first chassis and in which the plurality of second light sources and the light guide plate are disposed.

The second chassis may be formed to be stepped rearward from the first chassis.

The bottom chassis may further include a step connection portion connecting the first chassis and the second chassis stepped rearward from the first chassis, and the plurality of second light sources are disposed at the step connection portion.

The plurality of second light sources may be disposed between the light guide plate and the step connection portion and are configured to radiate the second light toward the incident surface of the light guide plate.

The second chassis may include: a first end connected to the step connection portion; and a second end opposite to the first end of the second chassis. The second chassis may be formed to be inclined with respect to the display panel such that the second end of the second chassis is closer to a rear surface of the display panel than the first end of the second chassis.

The second chassis may include a pair of the second chassis, and the pair of the second chassis may be formed on opposite ends of the first chassis, respectively.

The display panel may include: a first panel region to which the first light is transmitted from the plurality of first light sources; and second panel regions disposed at opposite sides of the first panel region and to which the second light emitted from the plurality of second light sources is transmitted.

The display apparatus may further include a reflective rib configured to cover the plurality of second light sources.

The display apparatus may further include a reflective member formed on the plurality of first light sources and including a reflective surface facing the display panel. The reflective rib may be configured to protrude from the reflective member formed on the plurality of first light sources.

The reflective rib may include: a first rib surface configured to extend from the reflective surface of the reflective member, configured to reflect the first light and facing a back surface of the display panel; and a second rib surface opposite to the first rib surface and facing the plurality of second light sources.

The reflective rib may be integrally formed with the reflective member.

The second chassis may include a pair of the second chassis, and the pair of the second chassis may be formed on upper and lower sides of the first chassis, respectively.

The second chassis may be formed along an entire periphery of the first chassis. In accordance with another aspect of the disclosure, a display apparatus includes a display panel; a bottom chassis including: a first chassis; and a second chassis formed at a periphery of the first chassis, the first chassis and the second chassis being disposed behind the display panel; and a light source assembly disposed in the bottom chassis and including: a plurality of first light sources disposed in the first chassis and configured to supply first light toward the display panel; a light guide plate including an exit surface facing the display panel and disposed in the second chassis; and a plurality of second light sources disposed at a first end of the second chassis adjacent to the first chassis and configured to supply second light to an incident surface of the light guide plate so that the second light is transmitted to the display panel through the exit surface.

The bottom chassis may further include a step connection portion connecting the first chassis and the second chassis stepped back from the first chassis. The plurality of second light sources are disposed between the light guide plate and the step connection portion and are configured to radiate light toward the incident surface of the light guide plate.

The display apparatus may further include: a reflective member formed on the plurality of first light sources and including a reflective surface facing the display panel; and a reflective rib configured to protrude from the reflective member and covering the plurality of second light sources.

The reflective rib may include: a first rib surface extending from the reflective surface of the reflective member, configured to reflect the first light and facing a back surface of the display panel; and a second rib surface provided opposite to the first rib surface and facing the plurality of second light sources.

In accordance with another aspect of the disclosure, a display apparatus includes a display panel including: a first panel region; and a second panel region provided at a periphery of the first panel region; a bottom chassis including: a first chassis; and a second chassis formed at a periphery of the first chassis, the first chassis and the second chassis being disposed behind the display panel; and a light source assembly and including: a plurality of first light sources disposed in the first chassis and configured to supply first light toward the first panel region of the display panel; a light guide plate disposed in the second chassis and including an exit surface facing the second panel region of the display panel; and a plurality of second light sources disposed in the second chassis and configured to supply second light to an incident surface of the light guide plate so that the light is transmitted to the second panel region through the exit surface.

In accordance with another aspect of the disclosure, a display apparatus includes a display panel including: a first panel region; and a second panel region provided at a periphery of the first panel region; a light source assembly configured to supply light to the first panel region and the second panel region; and a bottom chassis supporting the light source assembly and including: a first chassis provided at a center portion of the bottom chassis; and a second chassis formed at a periphery of the first chassis. The light source assembly may include: a plurality of first light sources disposed in the first chassis, facing the first panel region in a first direction and configured to supply first light directly toward the first panel region; a light guide plate disposed in the second chassis; and a plurality of second light sources disposed in the second chassis, emitting second light in a second direction perpendicular to the first direction and configured to supply the second light to the second panel region by means of the light guide plate.

The light guide plate may include: an incident surface receiving the second light from the plurality of second light sources; and an exit surface facing the second panel region and configured to transmit the second light received from the incident surface of the light guide plate to the second panel region.

The second chassis may be formed to be stepped rearward from the first chassis.

The plurality of second light sources may emit the second light in the second direction away from the center portion of the bottom chassis.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

Figure 1:
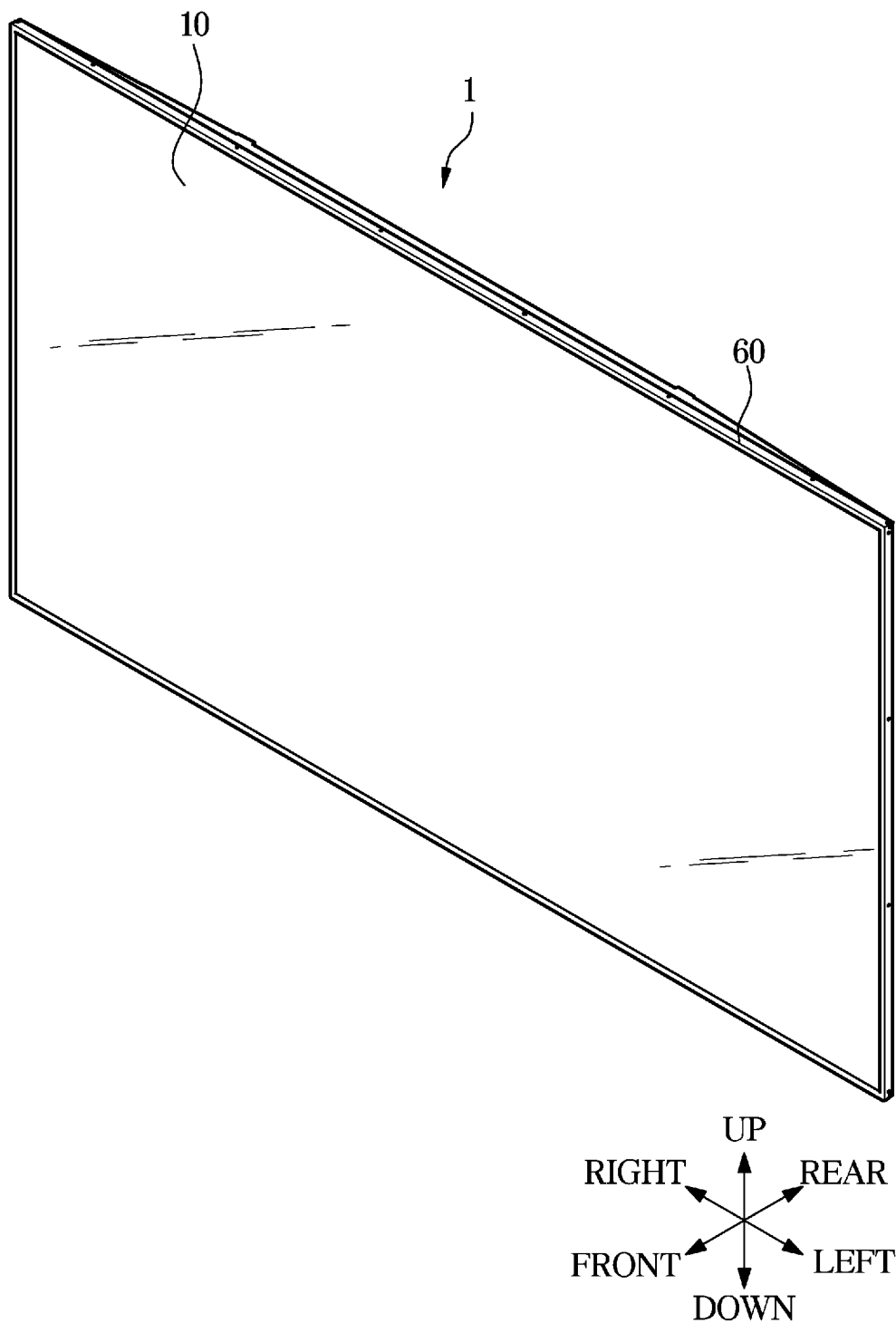
FIG. 1 is a perspective view of a display apparatus according to an embodiment of the disclosure.

The embodiments described herein and the configurations shown in the drawings are only examples of preferred embodiments of the disclosure, and various modifications may be made at the time of filing of the disclosure to replace the embodiments and drawings of the present specification.

Like reference numbers or signs in the respective figures of the present specification represent parts or components that perform substantially the same functions.

The terms used in the present specification are for the purpose of describing the embodiments and are not intended to restrict and/or to limit the disclosure. For example, the singular expressions may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

Hereinafter, embodiments according to the disclosure will be described in detail with reference to the accompanying drawings.

Figure 2:
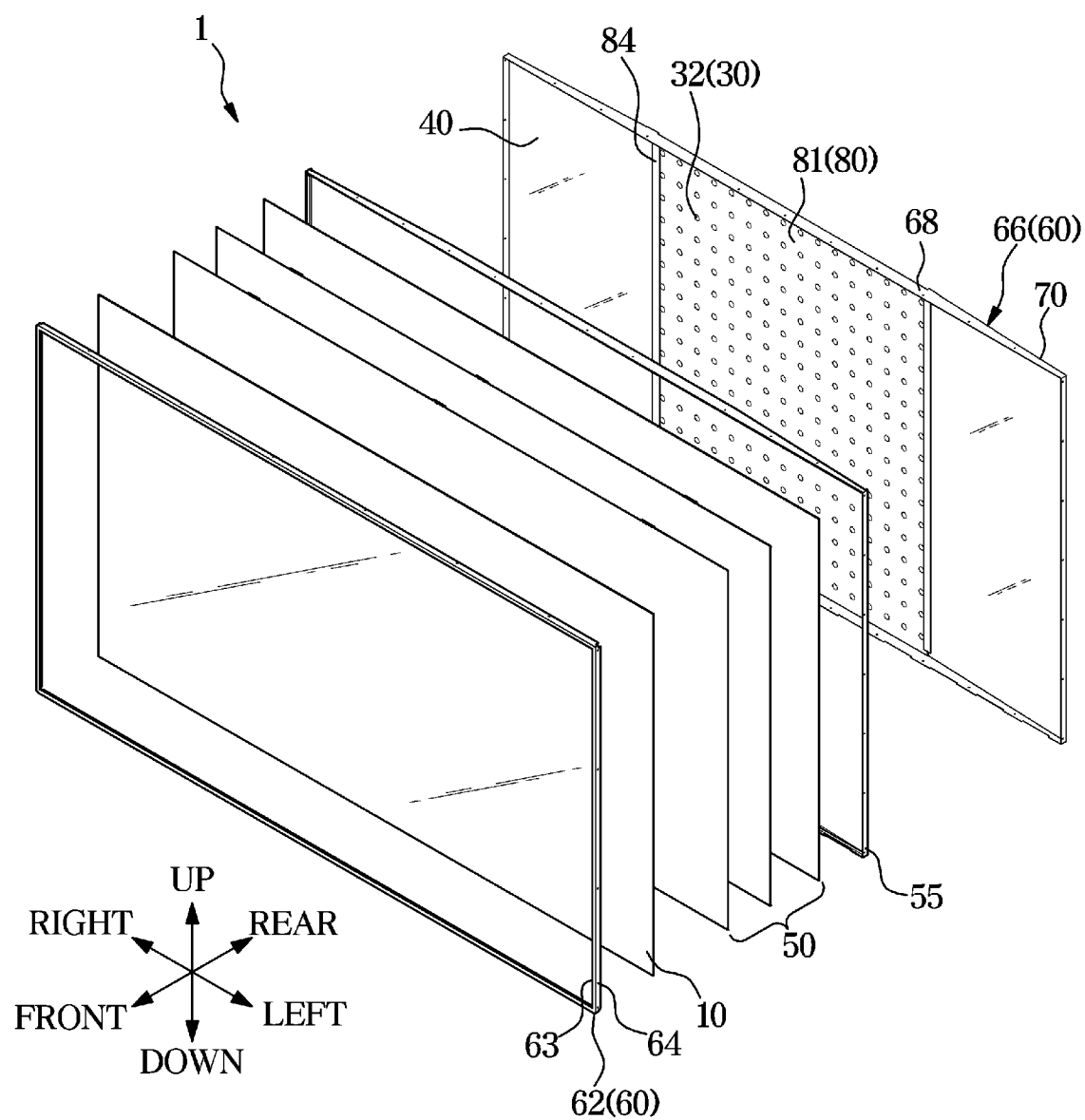
FIG. 2 is an exploded perspective view of the display apparatus according to an embodiment of the disclosure.
Figure 3:
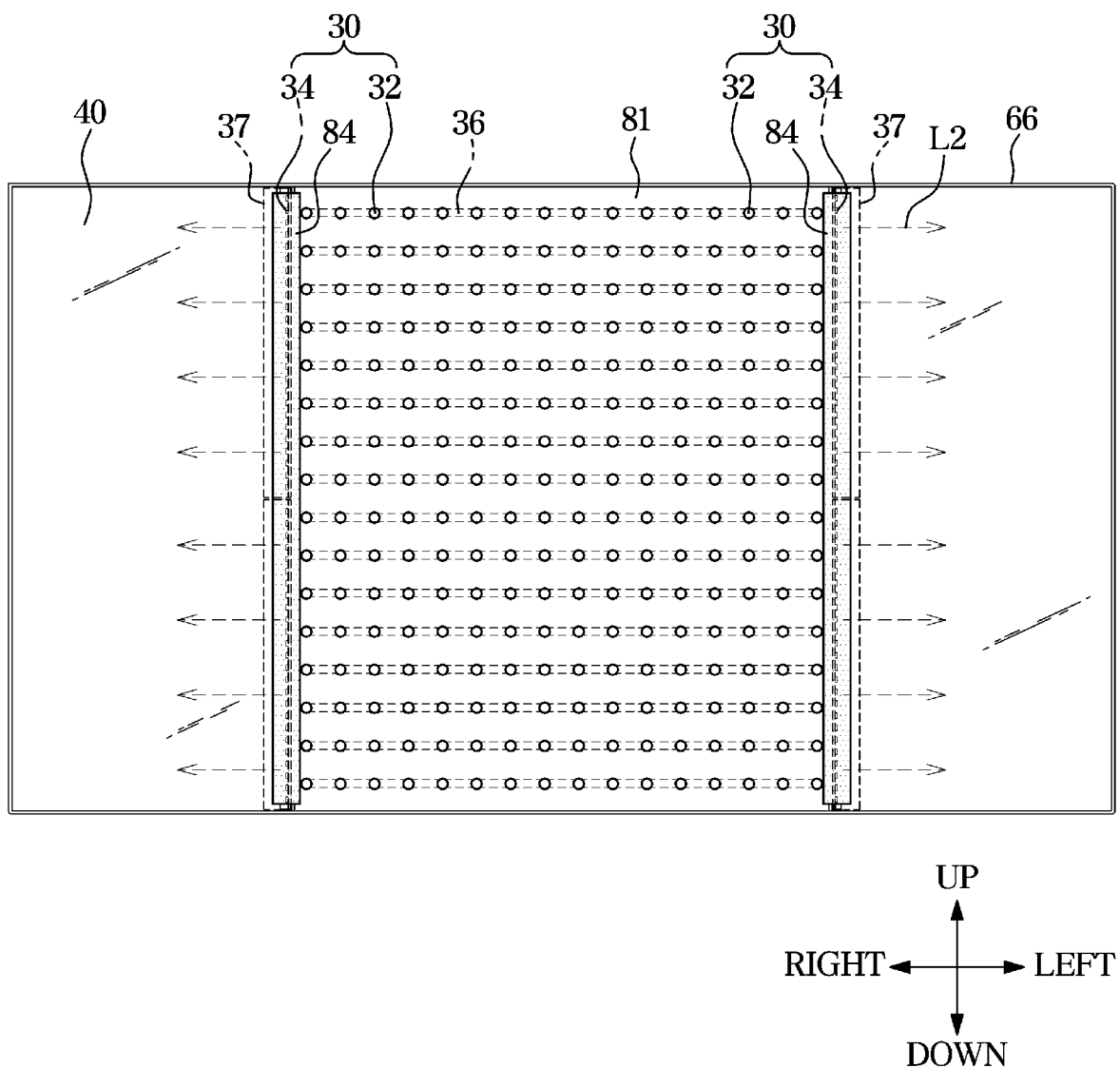
FIG. 3 is a front view of a light source assembly and a bottom chassis of the display apparatus according to an embodiment of the disclosure.
Figure 4:
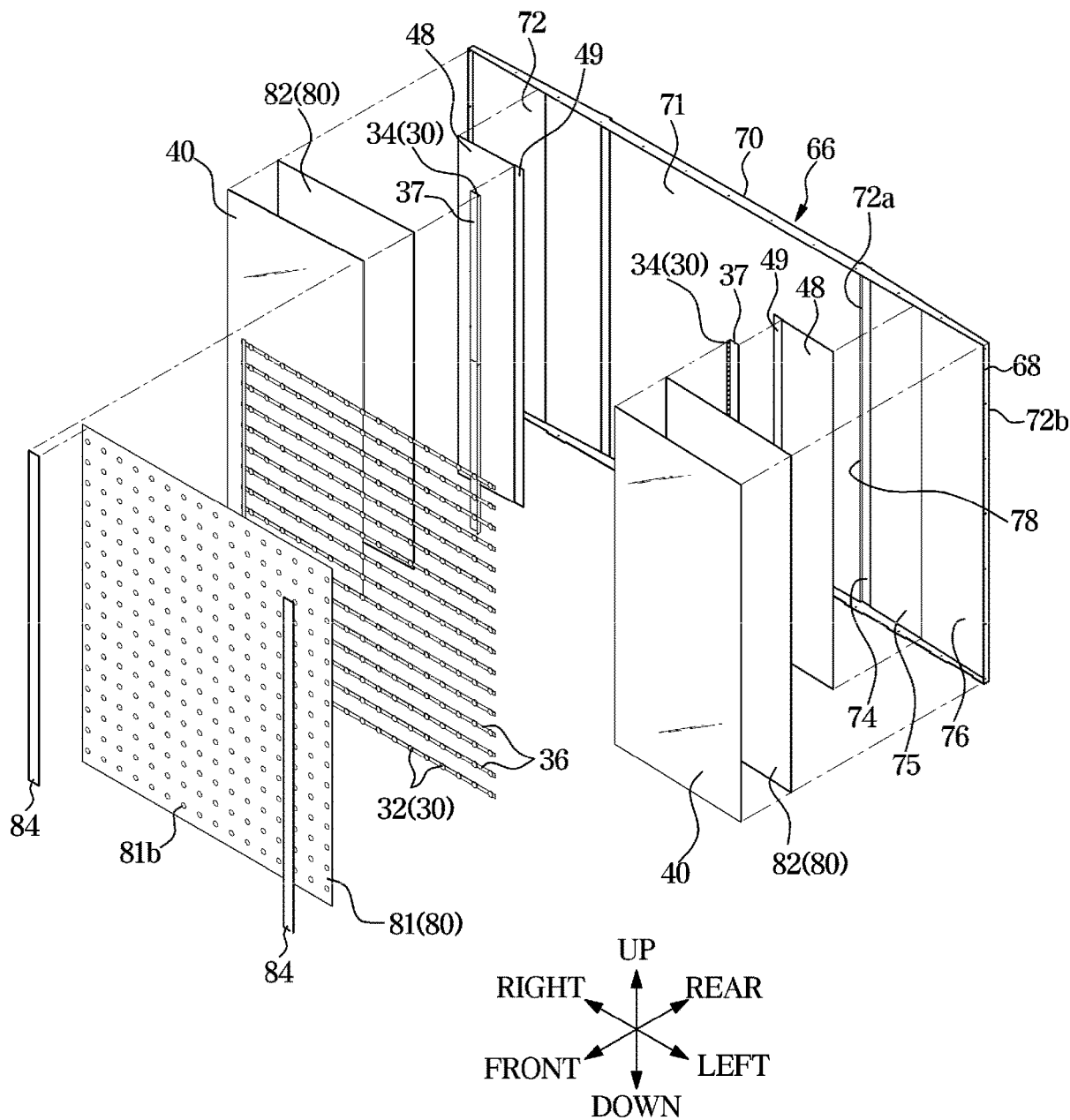
FIG. 4 is an exploded perspective view of the light source assembly and the bottom chassis of the display apparatus according to an embodiment of the disclosure.
Figure 5:
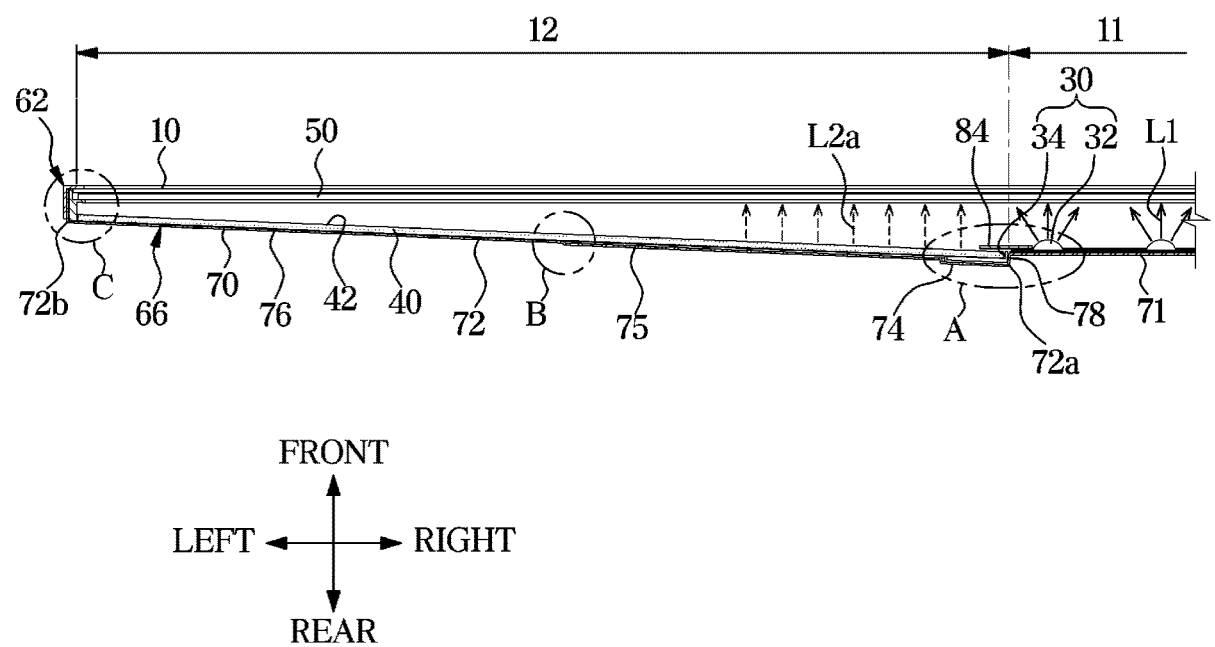
FIG. 5 is a cross-sectional view of the display apparatus according to an embodiment of the disclosure.
Figure 6:
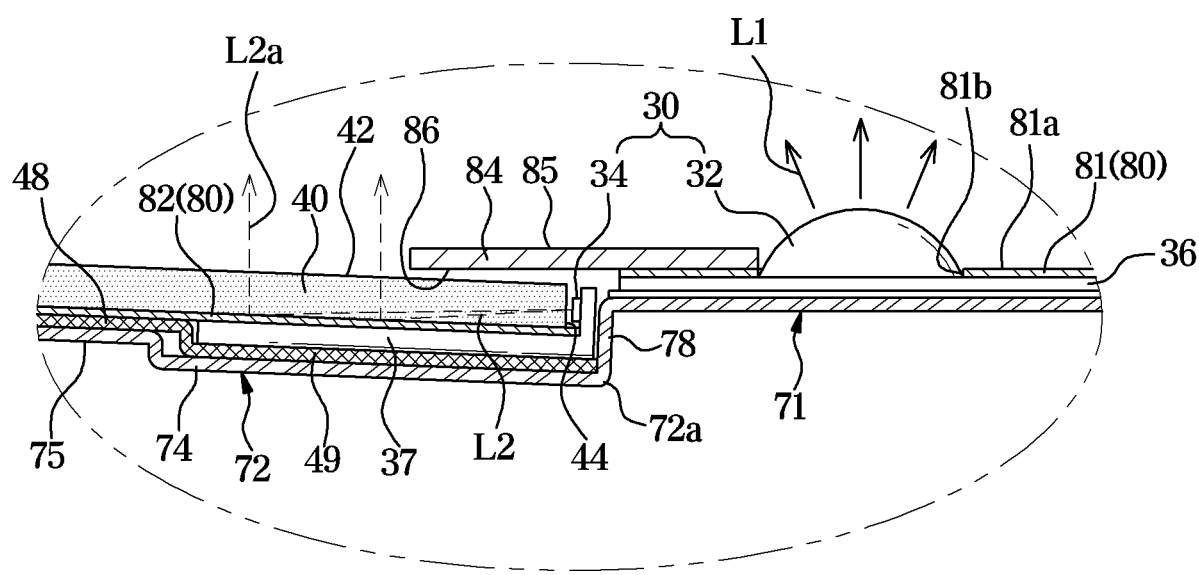
FIG. 6 is an enlarged view of a portion A in FIG. 5 according to an embodiment of the disclosure.
Figure 7:
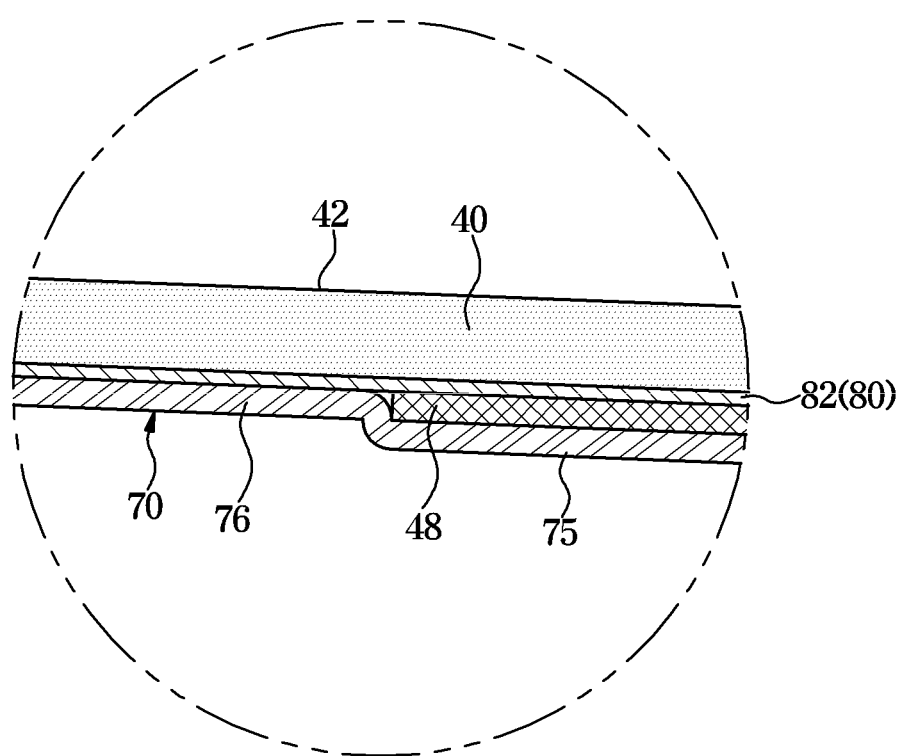
FIG. 7 is an enlarged view of a portion B in FIG. 5 according to an embodiment of the disclosure.
Figure 8:
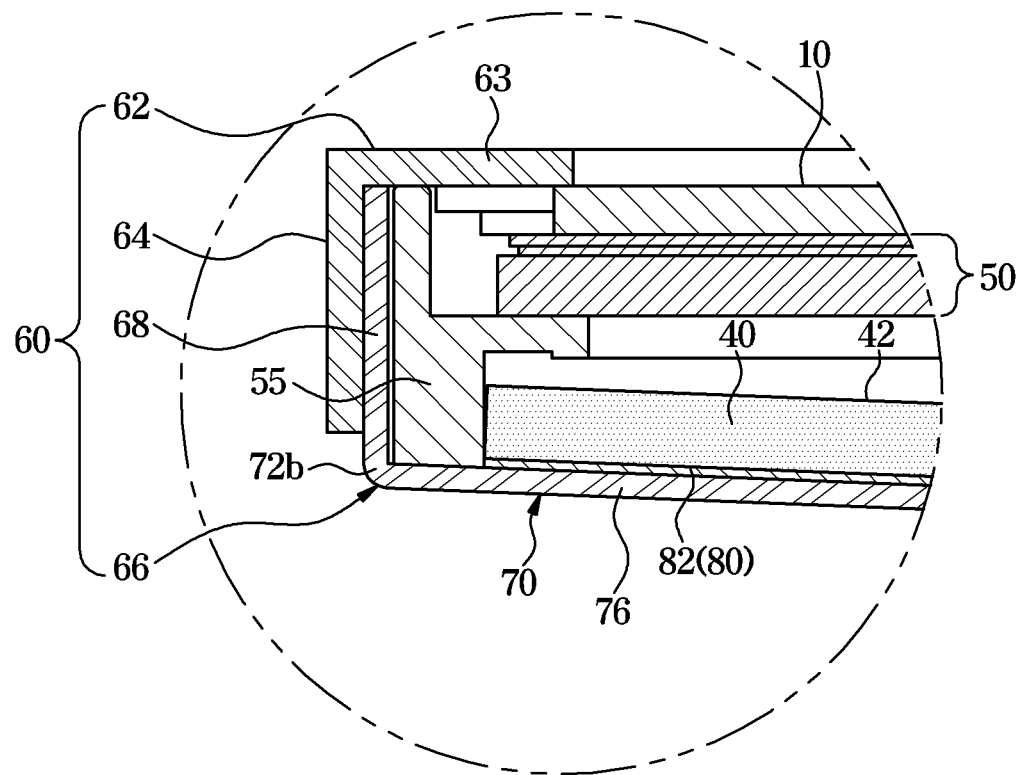
FIG. 8 is an enlarged view of a portion C in FIG. 5 according to an embodiment of the disclosure.

FIG. 1 is a perspective view of a display apparatus 1 according to an embodiment of the disclosure, and FIG. 2 is an exploded perspective view of a display apparatus 1 according to an embodiment of the disclosure. FIG. 3 is a front view of a light source assembly 30 and a bottom chassis 66 of a display apparatus 1 according to an embodiment of the disclosure, FIG. 4 is an exploded perspective view of a light source assembly 30 and a bottom chassis 66 of a display apparatus 1 according to an embodiment of the disclosure, and FIG. 5 is a cross-sectional view of a display apparatus 1 according to an embodiment of the disclosure. FIG. 6 is an enlarged view of a portion A in FIG. 5, FIG. 7 is an enlarged view of a portion B in FIG. 5, and FIG. 8 is an enlarged view of a portion C in FIG. 5.

Although a flat display apparatus is illustrated as an example to describe a display apparatus in the disclosure, the disclosure may also be implemented, for example, in a curved display apparatus having a screen with a fixed curvature, a curvature-variable display apparatus having a screen of a changeable curvature as well as the flat display apparatus.

A display apparatus 1 includes a display module to display an image.

The display module includes a display panel 10 on which an image is displayed, and a backlight unit which supplies light to the display panel 10. The backlight unit may be configured to transmit light to the display panel 10. In the embodiment, the backlight unit may include a light source assembly 30 and an optical sheet 50.

The light source assembly 30 may include first and second light sources 32 and 34 disposed at the rear of the display panel 10. The light source assembly 30 may also include a light guide plate 40 to diffuse the light supplied from a light source (e.g., a backlight unit) and transmit the light to the display panel 10 positioned at the front thereof. The light source assembly 30 will be described in detail later.

The optical sheet 50 may be disposed between the display panel 10 and the light source assembly 30 and possesses internal properties to change optical properties of the light from the light source assembly 30. The optical sheet 50 may allow light emitted from the light source assembly 30 and directed toward the display panel 10 to have uniform luminance. The light having uniform luminance passing through the optical sheet 50 is incident on the display panel 10. The optical sheet 50 may include at least one sheet. For example, the optical sheet 50 may include a protective sheet, and a prism sheet or a diffuser sheet.

The display apparatus 1 may include a middle mold 55 supporting the display panel 10 and a display chassis 60 forming an outer appearance of the display apparatus 1. The display chassis 60 may include a top chassis 62 positioned in the front of the middle mold 55 to maintain a state in which the display panel 10 is installed in the middle mold 55, and a bottom chassis 66 coupled to the rear of the middle mold 55. The light source assembly 30 may be disposed in the bottom chassis 66. The light source module may be disposed on the front surface (or the inner surface) of the bottom chassis 66 to radiate the light toward the display panel 10.

The display panel 10 and the top chassis 62 may be disposed (in that order) on the front surface of the middle mold 55, and the bottom chassis 66 may be disposed on the rear surface of the middle mold 55. Various components of the display apparatus 1 may be disposed between the top chassis 62 and the bottom chassis 66. The middle mold 55 allows the display panel 10 and the bottom chassis 66 to be kept in a state of being spaced apart from each other.

The top chassis 62 includes a bezel portion 63 (refer to FIGS. 2 and 8) to cover a front surface edge of the display panel 10, and a side surface portion 64 (refer to FIGS. 2 and 8) that is bent toward a rear side from an outer end portion of the bezel portion 63 to cover side surfaces of the middle mold 55.

The bottom chassis 66 includes a rear surface portion 70 (refer to FIGS. 2 and 8) forming a rear surface of the display module, and a side surface portion 68 (refer to FIGS. 2 and 8) that extends forward from a periphery of the rear surface portion 70 to be coupled to the middle mold 55. The bottom chassis 66 may be formed in the shape of a polygonal plate having high strength and include a metal material (e.g., aluminum or an aluminum alloy) that is resistant to the heat generated by the light source and/or the display panel 10 housed therein. Alternatively, the bottom chassis 66 may be molded of plastic (e.g., polycarbonate; PC) material or may be formed by adding glass fiber to a plastic material.

The light source assembly 30 may include a plurality of the first and second light sources 32 and 34 disposed at the rear of the display panel 10. The plurality of first light sources 32 may be direct-type light sources. The plurality of second light sources 34 may be edge-type light sources. The light supplied from the plurality of first and second light sources 32 and 34 may be transmitted to different regions of the display panel 10.

The light source assembly 30 may be disposed in the bottom chassis 66. The rear surface portion 70 of the bottom chassis 66 may include a first chassis 71 in which the plurality of first light sources 32 are arranged and a second chassis 72 in which the plurality of second light sources 34 are arranged. The second chassis 72 may be disposed adjacent to the first chassis 71. In the embodiment, the first chassis 71 may be formed at a central portion of the bottom chassis 66 and a pair of the second chassis 72 each may be provided at opposite sides of the first chassis 71 (in a left-and-right direction of the display apparatus 1). However, the arrangement of the first and second chassis 71 and 72 is not limited thereto. For example, the second chassis 72 may be configured to be provided around (i.e., surrounding) the first chassis 71. The second chassis 72 may be formed to be stepped rearward from the first chassis 71. The first chassis 71 and the second chassis 72 may be referred to as a first seating portion and a second seating portion, respectively. The first chassis 71 and the second chassis 72 may also be referred to as a direct-type seating portion and an edge-type seating portion, respectively.

A plurality of first light sources 32 may be disposed in the first chassis 71 and configured to supply light to the display panel 10. The plurality of first light sources 32 may be arranged in the first chassis 71 to be spaced apart from one another at a predetermined distance. A direct-type light source may be applied as the plurality of first light sources 32. That is, the plurality of first light sources 32 may be configured to directly supply light to the display panel 10. The plurality of first light sources 32 may be configured such that a lens is fitted therein for refraction or diffusion of light. The plurality of first light sources 32 may only refer to a light emitting element that generates light, and may refer to a light emitting package including a light emitting element and a lens that surrounds the light emitting element.

The light source assembly 30 may include the light guide plate 40. The light guide plate 40 may be disposed in the second chassis 72. In the embodiment, each of the second chassis 72 is provided at the opposite sides of the first chassis 71, and thus a pair of the light guide plates 40 may be provided to be disposed in the second chassis 72 (in a left-and-right direction of the display apparatus 1). The light guide plate 40 may receive light from the second light source 34 and transmit the received light to the display panel 10 through an exit surface 42 (FIGS. 5 and 6) formed on the front surface thereof.

The plurality of second light sources 34 disposed in the second chassis 72 may supply light to the light guide plate 40, and the light supplied to the light guide plate 40 may be transmitted to the display panel 10 through the exit surface 42 of the light guide plate 40. An edge-type light source may be applied as the plurality of second light sources 34. That is, referring to FIG. 6, the plurality of second light sources 34 may supply light to a side surface 44 (or an incident surface 44) of the light guide plate 40 and transmit light to the display panel 10 through the exit surface 42 of the light guide plate 40. Because the plurality of second light sources 34 is positioned in the second chassis 72 stepped further back than the rear of the first chassis 71, the plurality of second light sources 34 may be positioned at the rear of the plurality of first light sources 32.

The plurality of second light sources 34 may be disposed around the plurality of first light sources 32. Specifically, the plurality of first light sources 32 may be disposed at one region and the plurality of second light sources 34 may be disposed around the one region including the plurality of first light sources 32. For example, the one region may refer to the first chassis 71. The plurality of second light sources 34 may be arranged in one line in the up-down direction (FIGS. 1-4). The embodiment illustrates and describes that the plurality of first light sources 32 are arranged at one region of a central portion of the display apparatus 1 in the horizontal direction (left-right direction) and the plurality of second light sources 34 are arranged in a line extending in the vertical direction (up-down direction) on opposite sides (e.g., left side and right side) of the one region. However, the disclosure is not limited thereto, and the plurality of first light sources 32 may be arranged at the central portion in the vertical direction and the plurality of second light sources 34 may be arranged in a line extending in the horizontal direction in upper and lower sides of the one region. Also, the plurality of first light sources 32 may be arranged at the central portion in the vertical and horizontal directions and the plurality of second light sources 34 may be arranged along a periphery of the one region including the plurality of first light sources 32.

The plurality of second light sources 34 may be arranged around the periphery of the plurality of first light sources 32 to radiate light in a peripheral direction as indicated by L2 in FIG. 3.

The light sources in the edge-type display in the related art are arranged around the periphery of the bottom chassis 66 and radiate light toward the inside (the central portion) of the display apparatus 1. However, the plurality of second light sources 34 are arranged adjacent to the plurality of first light sources 32 disposed at the central portion of the display apparatus 1 and configured to radiate light toward the outer periphery of the bottom chassis 66. As the plurality of second light sources 34 are arranged adjacent to the plurality of first light sources 32 and configured to direct the light radiation direction toward the side surfaces of the display apparatus 1, the thickness of a peripheral portion of the display apparatus 1 may be further reduced. Also, as the first and second light sources 32 and 34 are disposed at the central portion of the display apparatus 1, the bezel portion 63 of the top chassis 62 may be thinned or completely eliminated.

The second chassis 72 may be configured to be inclined forward from a first end 72a (or a proximal end) close to the first chassis 71 to a second end 72b (or a distal end) distal from the first chassis 71. That is, the thickness of the display apparatus 1 may get thinned from the proximal end of the second chassis 72 to the distal end of the second chassis. With the above configuration, the second end 72b of the second chassis 72 may be positioned in the front of the first end 72a of the second chassis 72. That is, the second end 72b of the second chassis 72 may be positioned closer to the display panel 10 than the first chassis 71. As the second chassis 72 is formed to be inclined, the display apparatus 1 may be configured such that the thickness of the display apparatus 1 at the second end 72b of the second chassis 72 is smaller than the thickness of the display apparatus 1 at the first chassis 71 and the thickness of the display apparatus 1 at the first end 72a of the second chassis 72.

The display panel 10 may include first and second panel regions 11 and 12 (refer to FIG. 5).

The first panel region 11 of the display panel 10 corresponds to a region in the front of the plurality of first light sources 32 or the first chassis 71, and the second panel region 12 of the display panel 10 corresponds to a region in the front of the exit surface 42 of the light guide plate 40 or the second chassis 72. Through the above configuration, light L1 emitted from the plurality of first light sources 32 is transmitted to the first panel region 11 and light L2a emitted from the plurality of second light sources 34 and transmitted through the exit surface 42 of the light guide plate 40 is transmitted to the second panel region 12 of the display panel 10. In the embodiment, the first panel region 11 may be disposed at the central portion of the display apparatus 1 in the horizontal direction (in the left-to-right direction shown in FIGS. 1-4) and the second panel region 12 may be disposed at the opposite sides of the display apparatus 1 in the left-to-right direction. In the embodiment, the first and second panel regions 11 and 12 may be configured to be partitioned from each other, but the embodiment is not limited thereto. For example, the first and second panel regions 11 and 12 may be configured such that at least a portion thereof overlaps at the boundary thereof.

The first and second panel regions 11 and 12 receive the light emitted from the first and second light sources 32 and 34, respectively, so that local dimming in the first and second panel regions 11 and 12 may be separately implemented. That is, the local dimming may be implemented in the first panel region 11 by turning on/off at least a part of the plurality of first light sources 32, and the local dimming may be implemented in the second panel region 12 by turning on/off at least a part of the plurality of second light sources 34.

Referring to FIG. 6, the bottom chassis 66 may include a step connection portion 78 connecting the stepped first and second chassis 71 and 72. The step connection portion 78 may be configured to connect one end (i.e., the distal end) of the first chassis 71 and one end (i.e., the proximal end) of the second chassis 72. Because the plurality of second light sources 34 are positioned in the second chassis 72 stepped further back than the first chassis 71, the plurality of second light sources 34 may be positioned at the rear of the plurality of first light sources 32 on the step connection portion 78.

The plurality of first light sources 32 may be arranged in the central region of the display apparatus 1 and the plurality of second light sources 34 may be arranged around the central region of the display apparatus 1. The plurality of second light sources 34 may be configured to radiate light in the peripheral direction (or the outward direction) around the plurality of first light sources 32. The plurality of second light sources 34 may be configured to radiate the light L2 toward the periphery of the display apparatus 1 around the central region of the display apparatus 1.

The plurality of second light sources 34 may be arranged in the second chassis 72 to be adjacent to the step connection portion 78 to radiate light toward a periphery of the bottom chassis 66. The plurality of second light sources 34 may be arranged between the step connection portion 78 and the light guide plate 40 (in the left-to-right direction shown in FIGS. 1-4) to radiate light toward a side surface of the light guide plate 40.

A reflective member 80 is provided such that light supplied from the first and second light sources 32 and 34 is reflected forward toward the display panel 10. The reflective member 80 is configured to reflect the light radiated from the first and second light sources 32 and 34 toward the display panel 10 or to reflect the light reflected from the optical sheet 50 or the back surface of the display panel 10 toward the display panel 10 again. The reflective member 80 may include a high reflective coating of white or silver in color (e.g., silver, TiO2). The reflective member 80 may include a reflective sheet or a reflective plate.

The reflective member 80 may include a first reflective member 81 disposed in the first chassis 71 and a second reflective member 82 disposed in the second chassis 72.

The first reflective member 81 may be disposed at the side surface of the plurality of first light sources 32 to reflect light forward. The first reflective member 81 is configured to cover the second printed circuit boards 36 and the first chassis 71 and may include through holes 81b to allow the plurality of first light sources 32 to protrude through the first reflective member 81.

The second reflective member 82 may be configured to be disposed at the back surface of the light guide plate 40 to reflect light forward toward the display panel 10. The second reflective member 82 is configured to cover at least a portion of the second chassis 72 and may be configured to cover the opposite surface of the light exit surface 42 of the light guide plate 40.

The reflective member 80 may also include a reflective rib 84. The reflective rib 84 may be configured to cover the front of the plurality of second light sources 34. The reflective rib 84 may be disposed to be spaced apart from the second chassis 72, and the plurality of second light sources 34 may be disposed therebetween. A space through which the light radiated from the plurality of second light sources 34 passes may be formed between the reflective rib 84 and the second chassis 72.

As the reflective rib 84 is configured to cover the front of the plurality of second light sources 34, the reflective rib 84 may be configured to reflect the light directed to the display panel 10 from the plurality of second light sources 34 toward the side surface 44 of the light guide plate 40. Through the above configuration, the light supplied from the plurality of second light sources 34 may be redirected to the side surface 44 of the light guide plate 40 by the reflective rib 84.

The reflective rib 84 may be thicker than the first reflective member 81. The reflective rib 84 may be formed integrally with the first reflective member 81. The reflective rib 84 may be configured to protrude in the peripheral direction from the first reflective member 81 to cover the front of the plurality of second light sources 34. The reflective rib 84 may include a first rib surface 85 directed toward the back surface of the display panel 10 and a second rib surface 86 that is the opposite surface of the first rib surface 85. The first rib surface 85 may extend from a reflective surface 81a of the first reflective member 81. The first rib surface 85 may perform the same function as the reflective surface 81a. The second rib surface 86 may be configured to be directed to the plurality of second light sources 34. The reflective rib 84 may increase the efficiency of light from the plurality of first light sources 32 by extending the region of the first reflective member 81 through the above configuration. In addition, the reflective rib 84 may prevent light from being directly supplied to the display panel 10 from the plurality of second light sources 34, thereby preventing bright lines from being generated.

Though FIG. 6 illustrates that the reflective rib 84 protrudes further forward than the first reflective member 81 in the front-to-back direction, the disclosure is not limited thereto. For example, the first rib surface 85 of the reflective rib 84 and the reflective surface 81a of the first reflective member 81 may be coplanar.

The material of the reflective rib 84 is not particularly limited, but may include a molding structure having a thickness greater than that of the first reflective member 81.

The light source assembly 30 may include a plurality of first second printed circuit boards 36 and a second circuit board 37 on which the plurality of first and second light sources 32 and 34 is mounted, respectively. The plurality of first printed circuit boards 36 may be formed to extend in the horizontal direction in the first chassis 71 and arranged to be spaced apart from one another in the vertical direction. That is, the plurality of first light sources 32 are arranged along the horizontal direction on each first printed circuit board 36. However, the shape and arrangement of the first printed circuit boards 36 are not limited thereto. The second printed circuit board 37 may be formed to extend in the vertical direction. That is, the plurality of second light sources 34 are arranged along the vertical direction on the second printed circuit board 37. The second printed circuit board 37 may be disposed on a first plate 74 of the second chassis 72. The first plate 74 may be connected to the step connection portion 78 (FIGS. 5 and 6).

As shown in FIG. 5, the second chassis 72 may be configured such that a certain region is stepped. The second chassis 72 may include first to third plates 74, 75 and 76. With respect to the second light source 34, the first, second and third plates 74, 75 and 76 may be positioned such that the first plate 74 is the closest to the second light source 34, the third plate 76 is the farthest to the second light source 34 and the second plate 75 is provided therebetween. The first, second and third plates 74, 75 and 76 may be configured to be stepped forward in the order of the first, second and third plates 74, 75 and 76.

The plurality of second light sources 34 may be disposed on the first plate 74. That is, the first plate 74 may be configured such that one end thereof is connected to the step connection portion 78. The second printed circuit board 37 on which the plurality of second light sources 34 are mounted may also be supported by the first plate 74.

The second plate 75 is disposed further away from the plurality of second light sources 34 than the first plate 74 and is configured to be stepped forward from the first plate 74.

The light source assembly 30 may include a heat sink 48. The heat sink 48 is configured to absorb heat generated from the plurality of second light sources 34 or the light guide plate 40 to prevent the plurality of second light sources 34 or the light guide plate 40 from being overheated. The heat sink 48 is configured to extend from the first plate 74 to the second plate 75. That is, the heat sink 48 is configured to be positioned on the first and second plates 74 and 75.

The heat sink 48 may include a board seating portion 49. The board seating portion 49 is positioned on the first plate 74 and may be configured to be stepped rearward from a portion of the heat sink 48 located on the second plate 75 to correspond to the stepped structure of the first and second plates 74 and 75. Specifically, the heat sink 48 may be configured to cover the first and second plates 74 and 75. The heat sink 48 may be configured such that the light guide plate 40, the plurality of second light sources 34, the second reflective member 82, the second printed circuit board 37, and the like are positioned in the front of the heat sink 48.

The third plate 76 is configured to be disposed farther away from the plurality of second light sources 34 than the second plate 75 and to be stepped forward from the second plate 75. The light guide plate 40, and the second reflective member 82 located on the back surface of the light guide plate 40 are configured to extend from the first plate 74 to the third plate 76. That is, the light guide plate 40 and the second reflective member 82 are configured to be positioned across the first, second, and third plates 74, 75, and 76.

That is, the light guide plate 40, the second reflective member 82, the board seating portion 49 of the heat sink 48, the second printed circuit board 37, and the plurality of second light sources 34 are located in the front of the first plate 74. The light guide plate 40, the second reflective member 82 and the heat sink 48 are located in the front of the second plate 75. The light guide plate 40, and the second reflective member 82 are located in the front of the third plate 76. As such, fewer components may be located in the front of the third plate 76 than in the front of the second plate 75 and fewer components may be located in the front of the second plate 75 than in the front of the first plate 74, so that the thickness of the side surface of the display apparatus 1 may be reduced.

Hereinafter, the operation of the display apparatus 1 of the disclosure will be described.

The plurality of first light sources 32 are arranged in the first chassis 71 of the bottom chassis 66 and the plurality of second light sources 34 are arranged in the second chassis 72. The light supplied from the plurality of first light sources 32 may be supplied to the first panel region 11 of the display panel 10. The light L2 supplied from the plurality of second light sources 34 is emitted to the exit surface 42 which is the front surface of the light guide plate 40. The light L2a transmitted from the exit surface 42 of the light guide plate 40 may be supplied to the second panel region 12 of the display panel 10 facing the exit surface 42.

With this configuration, local dimming in the first and second panel regions 11 and 12 may be implemented independently. That is, local dimming in the first panel region 11 may be implemented by turning on/off at least a part of the plurality of first light sources 32. Also, local dimming in the second panel region 12 may be implemented by turning on/off at least a part of the plurality of second light sources 34.

The reflective rib 84 is disposed between the plurality of first and second light sources 32 and 34 so that the light supplied from the plurality of first and second light sources 32 and 34 may be prevented from overlapping each other.

Hereinafter, a display apparatus according to another embodiment of the disclosure will be described. A duplicate description for the same configuration as that described previously will be omitted.

Figure 9:
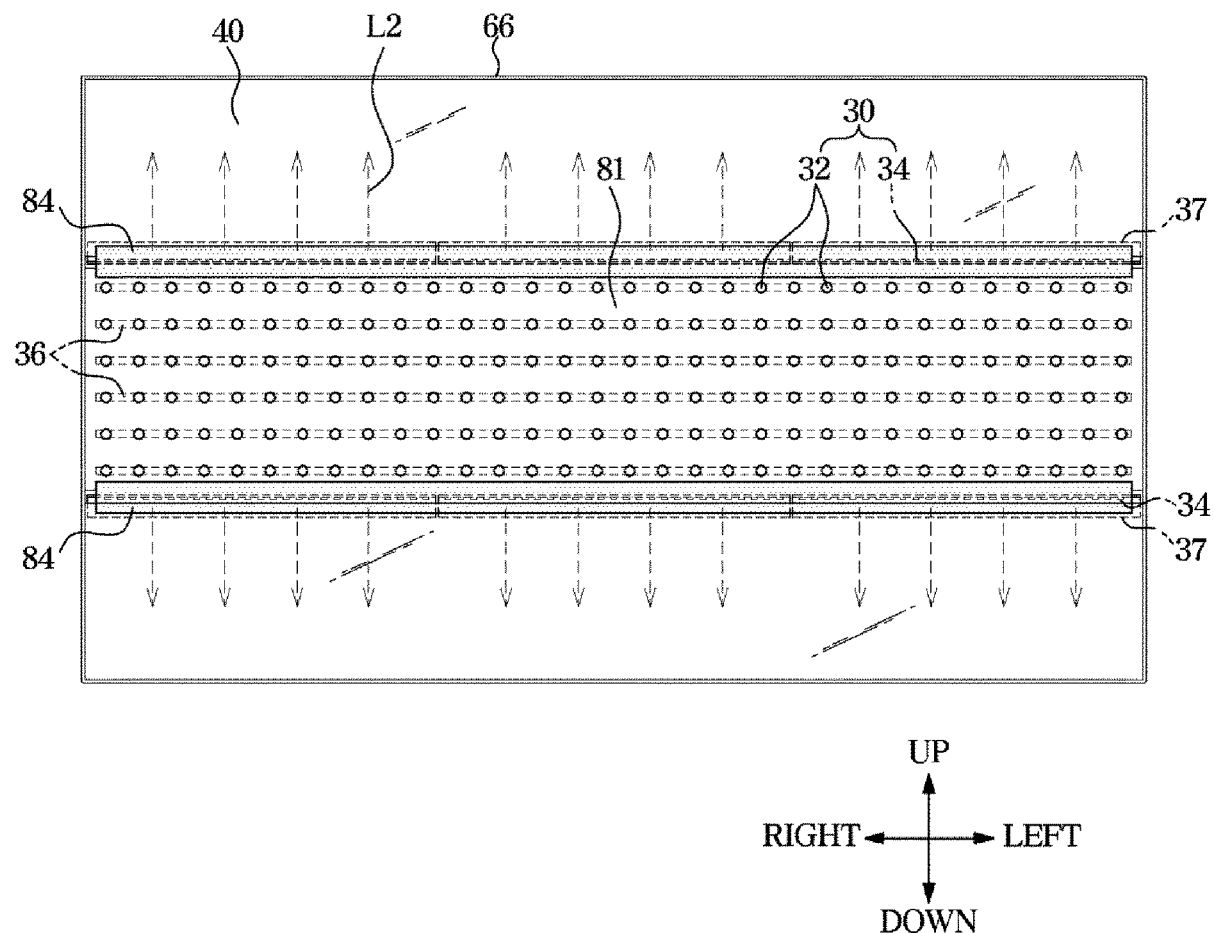
FIG. 9 is a front view of a light source assembly and a bottom chassis of a display apparatus according to another embodiment of the disclosure.

FIG. 9 is a front view of a light source assembly 30 and a bottom chassis 66 of a display apparatus 1a according to another embodiment of the disclosure.

The plurality of first light sources 32 are arranged at a central portion in the vertical direction, and the plurality of second light sources 34 may be arranged in a line in the horizontal direction in both upper and lower sides of the one region. The central portion may correspond to a region including the first chassis 71. The first chassis 71 in which the plurality of first light sources 32 are arranged and the second chassis 72 in which the plurality of second light sources 34 are arranged are provided on the rear surface portion 70 of the bottom chassis 66 so as to correspond to the above configuration. A pair of the second chassis 72 each may be provided in upper and lower sides of the first chassis 71. Although the first and second chassis 71 and 72 are not shown in FIG. 9 because they are covered with other components, the relationship between the plurality of first and second light sources 32 and 34 and the first and second chassis 71 and 72 may be understood by referring to the previous embodiment.

The plurality of first light sources 32 may be disposed in the first chassis 71 and configured to supply light to the display panel 10. The plurality of first light sources 32 may be arranged in the first chassis 71 to be spaced apart from one another at a predetermined distance. A direct-type light source may be applied as the plurality of first light sources 32. That is, the plurality of first light sources 32 may be configured to directly supply light to the display panel 10.

The plurality of second light sources 34 may be disposed in the second chassis 72 and supply light to the light guide plate 40, and the light supplied to the light guide plate 40 may be transmitted to the display panel 10 through the exit surface 42 of the light guide plate 40. An edge-type light source may be applied as the plurality of second light sources 34. That is, the plurality of second light sources 34 may supply the light L2 to the side surface 44 of the light guide plate 40 and transmit light to the display panel 10 through the exit surface 42 of the light guide plate 40. Because a pair of the light guide plates 40 are provided on upper and lower sides of the plurality of first light sources 32, respectively, light is supplied to the display panel 10 by the plurality of first light sources 32 in the central portion in the vertical direction, and the light supplied from the exit surface 42 of the light guide plates 40 may be transmitted to the display panel 10 through the upper and lower sides of the plurality of first light sources 32.

Hereinafter, a display apparatus according to another embodiment of the disclosure will be described. A duplicate description for the same configuration as that described previously will be omitted.

Figure 10:
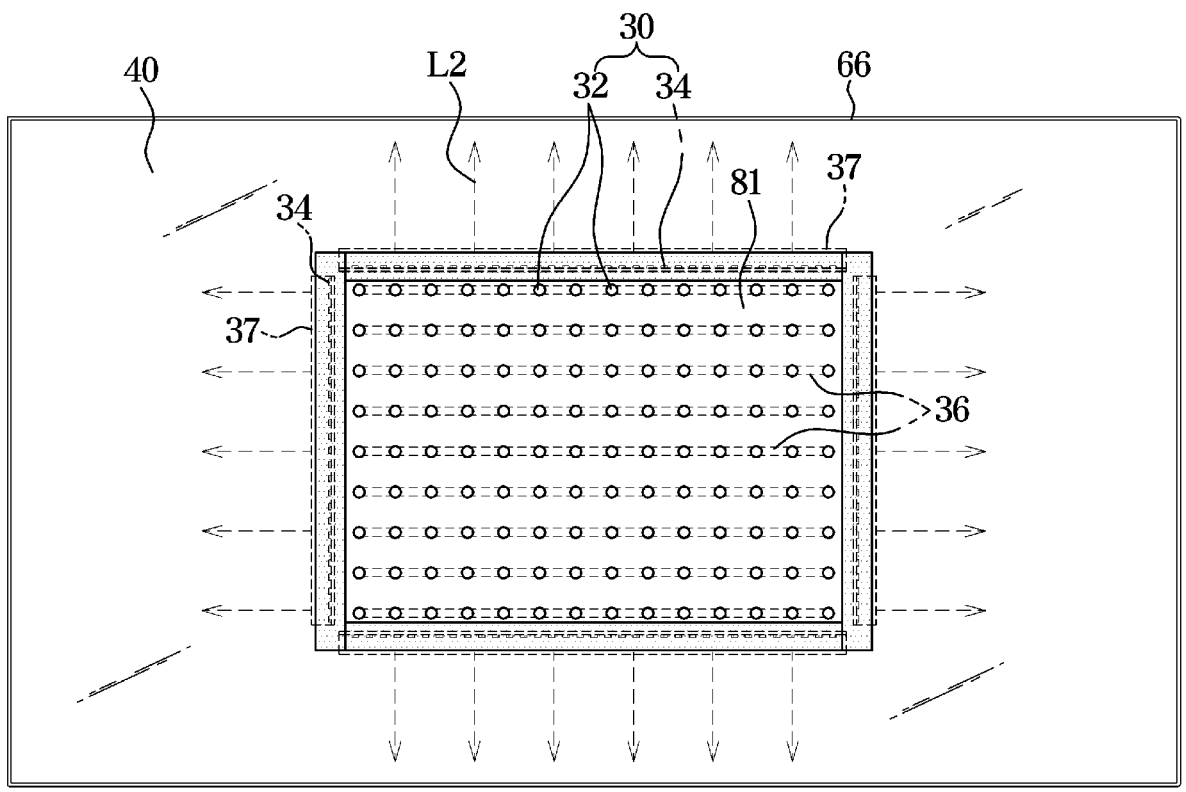
FIG. 10 is a front view of a light source assembly and a bottom chassis of a display apparatus according to another embodiment of the disclosure.
Figure 10:
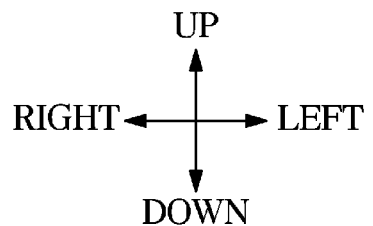

FIG. 10 is a front view of a light source assembly 30 and a bottom chassis 66 of a display apparatus 1b according to another embodiment of the disclosure.

The plurality of first light sources 32 may be arranged at a central portion in the vertical and horizontal directions and the plurality of second light sources 34 may be arranged along a periphery of the central portion. The central portion may correspond to a region including the first chassis 71.

The first chassis 71 in which the plurality of first light sources 32 are arranged and the second chassis 72 in which the plurality of second light sources 34 are arranged are provided on the rear surface portion 70 of the bottom chassis 66 so as to correspond to the above configuration. The second chassis 72 may be formed along the periphery of the first chassis 71. That is, the first chassis 71 may be disposed inside the second chassis 72. Although the first and second chassis 71 and 72 are not shown in FIG. 10, the relationship between the plurality of first and second light sources 32 and 34 and the first and second chassis 71 and 72 may be understood by referring to the previous embodiments.

The plurality of first light sources 32 may be disposed in the first chassis 71 and configured to supply light to the display panel 10. The plurality of first light sources 32 may be arranged in the first chassis 71 to be spaced apart from each other at a predetermined distance. A direct-type light source may be applied as the plurality of first light sources 32. That is, the plurality of first light sources 32 may be configured to directly supply light to the display panel 10.

The plurality of second light sources 34 may be disposed in the second chassis 72 and supply light to the light guide plate 40, and the light supplied to the light guide plate 40 may be transmitted to the display panel 10 through the exit surface 42 of the light guide plate 40. An edge-type light source may be applied as the plurality of second light sources 34. That is, the plurality of second light sources 34 may supply the light L2 to the side surface 44 of the light guide plate 40 and transmit the light L2a to the display panel 10 through the exit surface 42 of the light guide plate 40. Because the light guide plate 40 is provided along the periphery of the plurality of first light sources 32, the light L1 is supplied to the display panel 10 by the plurality of first light sources 32 in the central portion in the horizontal and vertical directions, and the light L2a supplied from the exit surface 42 of the light guide plates 40 may be transmitted to the display panel 10 through peripheral portions of the plurality of first light sources 32.

In the above embodiments, the first chassis 71 and the plurality of first light sources 32 are configured to have a rectangular shape, but the disclosure is not limited thereto. That is, the first chassis 71 and the plurality of first light sources 32 may have a circular shape or an elliptical shape. The first chassis 71 and the plurality of first light sources 32 may also have a partially curved shape. Accordingly, the plurality of second light sources 32 may be disposed in the second chassis 72 along a periphery thereof.

As is apparent from the above, a display apparatus according to an aspect of the disclosure may implement more efficient local dimming.

A display apparatus according to another aspect of the disclosure may improve image quality and light efficiency by improving the local dimming structure.

A display apparatus according to another aspect of the disclosure may have a thin side structure.

Although embodiments of the disclosure have been shown and described, it would be appreciated by those skilled in the art that changes may be made in these embodiments without departing from the principles and spirit of the disclosure in the scope of which is defined in the claims and their equivalents.

What is claimed is:

1. A display apparatus comprising:
   a display panel; and
   a light source assembly comprising:
      a plurality of first light sources disposed in a first region and configured to supply first light toward the display panel;
      a light guide plate comprising:
         an incident surface configured to receive second light; and
         an exit surface facing the display panel and configured to transmit the second light received from the incident surface of the light guide plate to the display panel; and
      a plurality of second light sources disposed on a periphery of the first region such as to face away from the plurality of first light sources, and configured to supply, in at least one direction away from the plurality of first light sources, the second light to the incident surface of the light guide plate.

2. The display apparatus according to claim 1, wherein the plurality of first light sources and the exit surface of the light guide plate are configured to face different portions of the display panel.

3. The display apparatus according to claim 1, further comprising a bottom chassis disposed behind the display panel and configured to support the light source assembly, the bottom chassis comprising:
   a first chassis in which the plurality of first light sources are disposed; and
   a second chassis disposed on a periphery of the first chassis and in which the plurality of second light sources and the light guide plate are disposed.

4. The display apparatus according to claim 3, wherein the second chassis is formed to be stepped rearward from the first chassis.

5. The display apparatus according to claim 3, wherein:
   the bottom chassis further comprises a step connection portion connecting the first chassis and the second chassis stepped rearward from the first chassis, and
   the plurality of second light sources are disposed at the step connection portion.

6. The display apparatus according to claim 5, wherein the plurality of second light sources are disposed between the light guide plate and the step connection portion and are configured to radiate the second light toward the incident surface of the light guide plate.

7. The display apparatus according to claim 5, wherein the second chassis comprises:
   a first end connected to the step connection portion; and
   a second end opposite to the first end of the second chassis, and
   wherein the second chassis is formed to be inclined with respect to the display panel such that the second end of the second chassis is closer to a rear surface of the display panel than the first end of the second chassis.

8. The display apparatus according to claim 3, wherein:
   the second chassis comprises a pair of the second chassis, and
   the pair of the second chassis are formed on opposite ends of the first chassis, respectively.

9. The display apparatus according to claim 3, wherein the display panel comprises:
   a first panel region to which the first light is transmitted from the plurality of first light sources; and
   second panel regions disposed at opposite sides of the first panel region and to which the second light emitted from the plurality of second light sources is transmitted.

10. The display apparatus according to claim 3, further comprising a reflective rib configured to cover the plurality of second light sources.

11. The display apparatus according to claim 10, further comprising a reflective member disposed at a side surface the plurality of first light sources and comprising a reflective surface facing the display panel,
    wherein the reflective rib is configured to protrude from the reflective member formed on the plurality of first light sources.

12. The display apparatus according to claim 11, wherein the reflective rib comprises:

a first rib surface configured to extend from the reflective surface of the reflective member, configured to reflect the first light and facing a back surface of the display panel; and a second rib surface opposite to the first rib surface and facing the plurality of second light sources.

13. The display apparatus according to claim 11, wherein the reflective rib is integrally formed with the reflective member.

14. The display apparatus according to claim 3, wherein:
the second chassis comprises a pair of the second chassis, and
the pair of the second chassis are formed on upper and lower sides of the first chassis, respectively.

15. The display apparatus according to claim 3, wherein the second chassis is formed along an entire periphery of the first chassis.

16. A display apparatus comprising:
a display panel;
a bottom chassis comprising:
  a first chassis; and
  a second chassis formed at a periphery of the first chassis, the first chassis and the second chassis being disposed behind the display panel; and
a light source assembly disposed in the bottom chassis and comprising:
  a plurality of first light sources disposed in the first chassis and configured to supply first light toward the display panel;
  a light guide plate comprising an exit surface facing the display panel and disposed in the second chassis; and
  a plurality of second light sources disposed at a first end of the second chassis adjacent to the first chassis and configured to supply second light to an incident surface of the light guide plate so that the second light is transmitted to the display panel through the exit surface,
wherein the bottom chassis further comprises a step connection portion connecting the first chassis and the second chassis stepped back from the first chassis, and wherein the plurality of second light sources are disposed between the light guide plate and the step connection portion and are configured to radiate light toward the incident surface of the light guide plate.

17. A display apparatus comprising:
a display panel;
a bottom chassis comprising:
  a first chassis; and
  a second chassis formed at a periphery of the first chassis, the first chassis and the second chassis being disposed behind the display panel; and
a light source assembly disposed in the bottom chassis and comprising:
  a plurality of first light sources disposed in the first chassis and configured to supply first light toward the display panel;
  a light guide plate comprising an exit surface facing the display panel and disposed in the second chassis; and
  a plurality of second light sources disposed at a first end of the second chassis adjacent to the first chassis and configured to supply second light to an incident surface of the light guide plate so that the second light is transmitted to the display panel through the exit surface;
a reflective member disposed at a side surface of the plurality of first light sources and comprising a reflective surface facing the display panel; and
a reflective rib configured to protrude from the reflective member and covering the plurality of second light sources.

18. The display apparatus according to claim 17, wherein the reflective rib comprises:
a first rib surface extending from the reflective surface of the reflective member, configured to reflect the first light and facing a back surface of the display panel; and
a second rib surface provided opposite to the first rib surface and facing the plurality of second light sources.

* * * * *